INVENTORS.
VERNON F. ALIBERT
THOMAS H. CAREY

BY

ATTORNEY.

United States Patent Office 3,561,831
Patented Feb. 9, 1971

3,561,831
TRANSDUCER SYSTEM FOR DETECTING CHANGES IN APPLIED FORCES
Vernon F. Alibert, Chester Heights, and Thomas H. Carey, Chester, Pa., assignors to Columbia Research Laboratories, Inc., Woodlyn, Pa., a corporation of Pennsylvania
Filed Dec. 3, 1969, Ser. No. 881,733
Int. Cl. H01v 7/00
U.S. Cl. 310—8.7                                      10 Claims

ABSTRACT OF THE DISCLOSURE

The present transducer system employs a piezo-electric device which is formed in a loop or an endless-belt configuration and which is polarized radially with respect to the longitudinal axis of said loop, i.e., polarized from the inside surface of said loop toward the outside surface thereof. The piezo-electric device is formed to be fitted circumferentially with a fluid container or fluid carrying conduit or a solid bar in such a fashion that any changes in pressure in the fluid or forces applied to the bar will cause strains in the direction of the radial polarization, i.e., perpendicular to the longitudinal axis or flow path of the conduit. The resulting radial strain generates a voltage which is proportional to the change in pressure of the fluid or the change in the applied force to the bar being monitored. The system provides a means for detecting the "strain generated voltage" and accordingly initiates monitoring or control signals in response thereto.

BACKGROUND

The use of piezo-electric crystals as electromechanical transducers is well known and the principle of generating voltages in response to strains in such piezo-electric crystals is well understood. However, heretofore when such a piezo-electric crystal has been employed with a fluid device it has been the practice to mount the crystal such that the sensitive axis of the crystal, or the direction of the polarization of the crystal, would lie parallel to the sensitive axis of the fluid carrying conduit, i.e., parallel to the flow path defined by the fluid carrying conduit. In such arrangements, of course, the fluid flows against the piezo-electric element and causes a strain in the crystal in the direction of the sensitive axis and therefore generates a voltage in the direction of the sensitive axis.

However such prior art arrangements have certain drawbacks. First, when a piezo-electric crystal is strained in the direction of the sensitive axis and is accordingly polarized in the direction of the sensitive axis of the fluid-carrying circuit, the crystal acts somewhat omnidirectional and there results strains, very often referred to as transverse responses, which are perpendicular to the sensitive axis. Under such conditions, despite the polarization of the crystal, there are generated spurious signals which result from said transverse responses. These spurious signals act to interfere with, or provide noise to, the system which is detecting the forces that are applied along the sensitive axis. There has been an effort in the prior art to carefully fabricate piezo-electric crystals in an effort to eliminate such transverse responses and thereby rid such transducer systems of the spurious signals. As is well known the effort to fabricate such crystals has been less than completely satisfactory, and at best this effort has resulted in more costly crystals and therefore more costly transducer apparatus using piezo-electric crystals.

Further according to the prior art, when piezo-electric crystals which are poled along the sensitive axis, are used to monitor, or control, fluid flow in an interference mode of operation, such crystals serve as an impediment to the fluid flow and act to load the fluid flow system. Accordingly, the flow pattern and the resulting pressures which are detected are not accurate with respect to what is truly present in the system. In addition, in the prior art when such transducers with the sensitive axis polarization are employed in a system which operates to record absolute pressure, or gauge pressure, or differential pressure measurements as well as in-line measurements the problem is not a simple matter because the amount of physical surface of the crystal which can be used to determine the comparison forces is not ordinarily sufficient, and in the alternative, if such a surface is made sufficient, the cost of the crystal load to the pressure system is increased. It should also be noted that in many modes of operation the prior art crystal is subjected to the full pressure of the fluid and hence high pressure systems are limited by the physical strength of the crystal per se.

SUMMARY

The present transduced system advantage of the concept that when a force is applied to a fluid or to a solid, the fluid or the solid responds to that force by exerting an omnidirectional force. The present system takes advantage of such a concept by employing a crystal which is formed to be mounted circumferentially with a fluid carrying conduit or around a solid bar and which is polarized radially with respect to the longitudinal axis of the conduit or the bar. Hence when the conduit is subjected to a force against the inner surface thereof such a force is detected over the surrounding surface of the piezo-electric crystal which is a relatively large surface. The same is true of a solid bar. Since the piezo-electric crystal is poled radially with respect to the flow path of the conduit or the axis of the bar, the foreging described forces, which act aganist the sides of the conduit, act to strain the piezo-electric crystal in the direction of its polarization.

Because there is this relatively large strain area available, the signals which are thus generated are strong or, in the alternative, if the forces are relatively weak the transducer action of the crystal can be made more sensitive with thinner conduit walls than in the prior art. In addition, because of the combination of the physical location of this circumferentially mounted transducer; the large area to which the forces can be applied; and the availability of a chamber to house the crystal and thus provide a norm, the system lends itself to being readily adaptable for measuring absolute, gauge or differential pressures as will become more apparent hereinafter.

The objects and features of the present invention will be more readily understood if the description thereof is studied in conjunction with the drawings in which.

The present invention employs a piezo-electric crystal as part of a mechanism for detecting and responding to changes of force in either fluid materials or solid materials. The principle of piezo-electricity is well known and carefully set forth in such texts as "Piezo Electricity" by Walter G. Cady, published by McGraw-Hill Company in 1946 and many other such texts and scientific journals and articles. It is also well known that piezo-electric crystals can be formed of barium titinates and various combinations of lead titinate, lead-zirconates and other materials. The present invention employs such normally formed piezo-electric crystals. Further, it is well understood that piezo-electric crystals can be "poled" in a particular direction with the normal practice being to polarize a crystal in the direction along its central axis or longitudinal axis for transducer applications. For the purpose of this specification, the theory of piezo-electricity need not be discussed in detail nor the materials from which it is made nor the process for its polarization, but it should be understood that the piezo-electric crystal employed in the present invention is a crystal which responds in the usual fashion, i.e., to generate a voltage when forces are applied to its surfaces and that such voltages will have one polarization in response to expansion and the opposite polarization in response to compression. Further, it should be understood, with respect to the teaching of this invention, that the present crystal is formed in a loop or an endless belt-like configuration and can be shaped as a circle, or oval, a teardrop, etc. The polarization is from the inner surface of the loop to the outer surface of the loop or in a direction radial from the longitudinal axis of the loop formed by the crystal. Further it should be understood that while the description teaches the polarization is from the inner surface to the outer surface it could be from the outer surface to the inner surface, but nonetheless in a direction radial to the longitudinal axis of the loop formed by the crystal.

Figure 1:
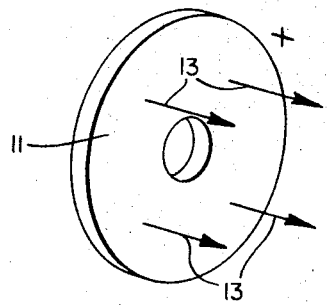
FIG. 1 depicts a piezo-electric crystal as used in the prior art.

In FIG. 1 there is depicted a piezo-electric crystal 11 which is a piezo-electric crystal as such have been normally used and not in accordance with the present invention. It will be noted that the piezo-electric crystal 11 is poled from left to right or in accordance with the arrows 13. For consistency in this description let it be understood that the direction of the polarization will define a positive polarity voltage at the arrow tip in the direction of the polarization and a negative polarity voltage at the source of the arrow.

Figure 2:
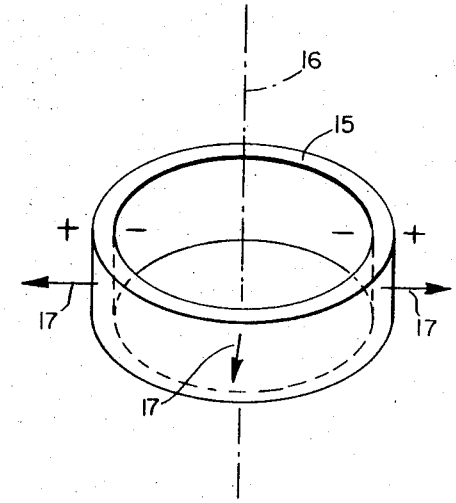
FIG. 2 depicts a radially poled piezo-electric crystal as employed with the present invention.

FIG. 2 shows a substantially circular piezo-electric crystal 15 of the type used with the present invention. It will be noted that the crystal 15 is polarized radially from its longitudinal axis 16 in accordance with the arrows 17. The same voltage convention is shown with respect to the crystal 15, i.e., there is a positive polarity voltage developed at the tip of the arrow in the direction of the polarization and a negative voltage developed at the source of the arrow. With respect to crystal 15 the negative voltage is at the inner surface of the crystal while the positive voltage is at the outer surface of the crystal. As indicated earlier, the direction of polarization could have been inward toward the longitudinal axis 16 with the polarization thus reversed. It is understood that if there is a force directed against the inner surface of the loop formed by the crystal 15 the voltage as depicted in FIG. 2 will be generated. On the other hand, if forces are applied to the outer surface of the crystal 15 the voltage generated would be reversed from that depicted in FIG. 2. Hence in response to an applied force the voltage generated by compression is the opposite of the voltage generated by expansion, although with respect to a circuit which employs such voltage signal the voltage is ordinarily useful whether the crystal is expanding or compressing.

Figure 3:
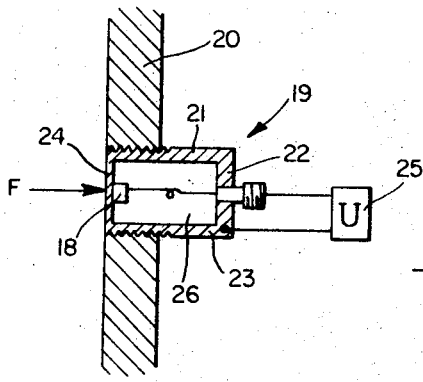
FIG. 3 depicts a typical mounting system as employed in the prior art.

FIG. 3 shows a typical prior art utilization of a piezo-electric crystal of the kind shown in FIG. 1. In FIG. 3 there is shown a crystal 18 which is mounted in a housing 19 and the latter is shown threaded into a tank wall 20. The housing 19, it will be noted, has three thick sides 21, 22 and 23 with a relatively thin fourth side 24. In the prior art when a force was applied against the tank wall, such as the force depicted by the arrow F there was a resulting strain on the piezo-electric crystal 18 and accordingly a resulting voltage generated. The circuit to transmit the generated signal was from the one surface of the crystal along the wire 26 to the utility device 25 and from the other surface of the crystal through the housing to the utility device 25. There are a number of drawbacks with this particular kind of device.

First, the reason that the housing 19 has three thick walls is to prevent any outside forces from being applied to the crystal 18 because these outside forces create transverse responses which result in spurious signals being transmitted to the utility device 25. In addition when the force F is applied to the wall 24 it creates transverse responses (in addition to the major response along the sensitive axis) which in and of themselves create spurious signals or noise to be transmitted to the utility device. Further any vibrations on the wall of the tank 20 would result in a component of force which is parallel to the sensitive axis of the crystal 18 and thus the system or the utility device 25 must cope with further spurious signals resulting from vibrations on the tank 20. Such vibrations result from any extraordinary forms of pressures or forces being applied to the tank. In addition, if the full impact of the force F is applied directly to the crystal 18, the upper limit of a change of force, or pressure, that can be monitored or dealt with in a prior art system is the limit of the physical strength of the crystal itself. If, on the other hand, the extraordinary forces which are applied to the tank have components which are transverse to the crystal by virtue of the coupling through the masses, these transverse forces produce transverse strains in the crystal and result in the same spurious signals. As said earlier there has been great effort in the prior art to carefully form the crystalline structure of the piezo-electric crystals to offset the transverse strains, but such transverse strains are never fully limited.

In addition if the device shown in FIG. 3 is to be used in a mode of operation where the pressure to be detected is absolute pressure or a differential pressure between some pressure in the tank and some pressure outside of the tank, then the chamber 26 will either have to be subjected to a vacuum condition or some high pressure (or possibly ambient for "gauge" pressure). In any one of these arrangements the differential pressure measured is proportional to the amount of surface which the crystal can provide to the chamber and to the tank surface. Inasmuch as it is desirable to make these inserts miniaturized it follows that the amount of surface normally provided is somewhat limited.

The present invention utilizes the effect of transverse polarization as will become apparent hereinafter. By providing a crystalline structure which is loop formed, or in an endless belt configuration, there are virtually no forces applied to the crystal itself along the axis of the loop which would be the normal axis of sensitivity for the prior art crystals because it has very little surface to which to apply such forces. In addition because of the manner in which it is mounted there is virtually no occasion to respond to forces along the axis of the loop. Hence, the present invention employs a piezo-electric crystal which is in essence unidirectional in its response. In addition because the present piezo-electric crystal is polarized radially and in one use is mounted so that its direction of polarization is parallel to the fluid holding body the effect of spurious signals is eliminated. For instance when an outside force is applied, the spurious signals, which may be generated by said body and which are normally perpendicular, (or at least have a component of force which is perpendicular), to the sides of said body do not cause any strains in the direction of polarization of the present crystal. On the other hand, when said body is vibrated or subjected to a force which is parallel to the side of said body, the voltages which result in the loop crystal (as a result of this last mentioned force) cancel one another and hence there are no spurious signals generated in the present system. Further, as will become apparent hereinafter when the present device is used as an in-line monitor or mechanism it does not provide an impediment to the fluid flow.

Figure 4:
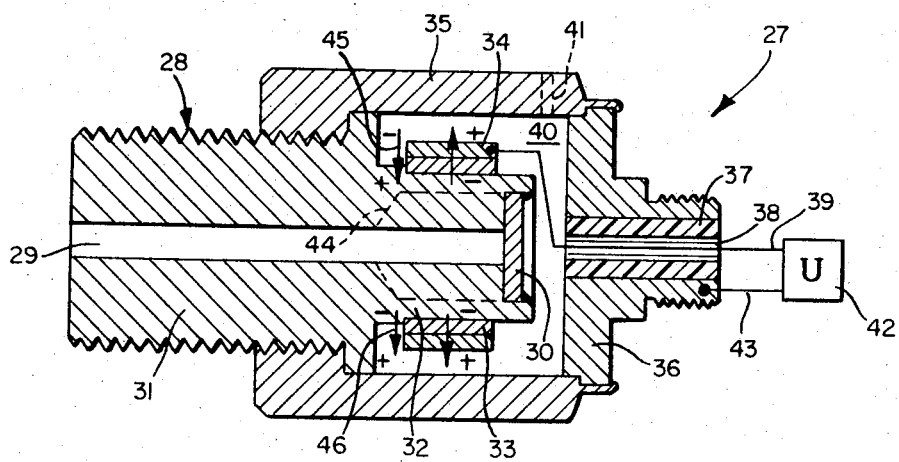
FIG. 4 depicts the present invention employed as a high pressure transducer and in phantom as a low pressure transducer.

Consider FIG. 4 which shows the present invention employed in a configuration to be used as a high pressure transducer. In FIG. 4 consider that the coupling member 27 is mounted by virtue of its threads 28 into the tank wall similar to the mounting of the housing 19 into the wall 20 as shown in FIG. 3. When the coupling member 27 is so mounted the fluid which is held by the tank, or the pipe, or the conduit, which is being monitored will enter into the chamber 29 and will fill that chamber. The chamber 29 is blocked by the end piece 30. It should be apparent from the drawing shown in FIG. 4 that the coupling member 27 is composed of a metallic center piece 31 which has an aperture or chamber 29 formed therein which aperture is blocked by an end piece 30. The end piece 30 is secured to the center piece 31. The center piece 31 has a detection section or protrusion 32 formed thereon and as can be seen in the figure the aperture 29 is formed through the protrusion 32. Mounted around the detection section or protrusion 32 is the endless belt-like or loop crystal 33. Mounted around the crystal 33 is a connecting ring 34. The connecting ring 34 can be made of any good electrical conducting material and in the preferred embodiment is made of copper. The center piece 32 is also made of a good conducting material and since strength is a consideration in this embodiment the center piece 32 is made of stainless steel.

The remainder of the housing comprises an overlay piece 35 which can be made of any rigid electrically conducting material, and an insert element 37. The insert element 37 has an aperture 38 formed therein through which an electrical wire is disposed which electrical wire 39 is shown connected to the connecting ring 34. The insert 37 is preferably made of a non-electrically conducting material in order to electrically isolate the end cap 36 and therefore the whole metallic housing from the connecting ring.

If the particular embodiment shown in FIG. 4 is to be used to measure absolute pressure or some other differential form of pressure then the chamber 40 must be carefully sealed against the ambient conditions. For instance, if the device were used to measure absolute pressure then the chamber 40 would be evacuated and a vacuum condition would be sealed therein, and on the other hand if the pressure were to be measured against some higher pressure then the chamber 40 would be filled with some inert gas which would be built up to some specific pressure. Accordingly, there is shown in phantom a channel 41, or an aperture 41, which can be used to either evacuate the chamber 40 or to load the chamber 40 with gas as the case may be. Obviously, if the chamber 40 was in a vacuum condition the pressure measured by the crystal would be against no opposing forces at its outer surface and would measure absolute pressure and in the other condition when the chamber 40 is loaded with inert gas at some specific pressure there is a force applied to the outer surface against which the forces applied to the inner surface is compared by the voltage generated. One of the advantages of the present device is seen in this particular concept in that the amount of surface which is available for pressure measurement is greatly increased because the surface which can be subjected to the forces, completely surrounds the detection section 32 and has an equally great outer surface exposed to the chamber 40.

When there is a change of pressure in the tank which is being monitored by the device shown in FIG. 4 the forces resulting from that change of pressure are exerted on the fluid in the aperture 29 and since such forces are omnidirectional there is a force applied against the end piece 30 which force is parallel to the longitudinal axis of the aperture 29. However, at the same time there is a force applied against the inner surface of the crystal 33 which force is radial to the longitudinal axis of the aperture 29 and which force is radial to the longitudinal axis of the closed loop formed by the crystal 33 (hence in the direction of the polarization of the present crystal). It will be noted that the component of force which is applied to the end piece 30 causes virtually no strain on the crystal 33 while the transverse forces would have been unwanted in the prior art, i.e., with the use of crystal such as that shown in FIG. 1, provide the usable strain in the crystal 33. The resulting strain in the crystal 33 is everywhere from the inside surface toward the outside surface so that the voltage generated in response to said strain is additive along the entire crystal and hence there is a voltage signal which is transmitted from the outer surface of the crystal 33 through the collector ring 34 along the wire 39 to the utility device 42. The other side of the circuit is from the inner surface of the crystal 33, through the center piece 31, through the overlay element 35, through the end cap 36 along the wire 43 to the utility device 42. Hence, the voltages which in the prior art were considered unwanted and because of which a great deal of effort has been put into the formulation of crystals to eliminate the same, are employed in the present invention as a means for measuring a change in pressure condition within a tank.

It will be noted that the wall of the protrusion 32 is relatively thick in comparison to the depth of the crystal and the collector ring. As was indicated earlier, this particular configuration is to be used with a high pressure system. Accordingly, the walls of the center piece, or the protrusion thereon upon which the loop crystal is mounted, are relatively thick. If this same device were to be used with a low pressure system then the protrusion would have the aperture 29 formed therein in accordance with the phantom line 44 so that there would be a relatively large chamber within the the protrusion 32. This arrangement would reduce the wall structure between the crystal and the chamber or aperture so that there would be no loss in signal because of a thick wall and the crystal could respond to relatively small changes in a low pressure system.

Consider for the momement what would happen if the wall of the tank or the conduit carrying the fluid and into which the coupling member 27 has been mounted were struck with a wrench on the outer surface. Such a blow would cause vibrations and thereby forces which would have a large component thereof that would be perpendicular to the surface of the tank, and substantially parallel to the direction of the blow of the wrench. Accordingly, these last mentioned forces would operate upon the housing 27 through the threaded portion and through its entire mass to exert a force throughout the housing and all portions thereof which would be substantially perpendicular to the surface of the tank and accordingly substantially parallel to the longitudinal axis of the aperture 29. It is apparent that such forces would have no effect or provide no strains in the crystal 33 and hence there would be no spurious signals generated because of such a blow. It will be recalled that such a blow would cause spurious signals in the use of the piezo-electric device as described in FIG. 3. On the other hand, such a blow would also have a component of force which was parallel to the surface of the tank and this component of force would be transmitted to that housing 27 to vibrate that housing and all portions thereof parallel to the wall of the tank.

Consider for the moment that this last mentioned component of force is moving downward and hence the effect on the crystal is shown by the arrows 45 and 46. Alongside of the arrow 45 there is shown the voltage polarity that would be generated by a force which tends to compress the ring from the outer surface toward the inner surface while the voltages shown alongside the arrow 46 shows the voltages which are generated by a force which tends to expand the inner surface toward the outer surface. It should be remembered that the two voltages are generated simultaneously and respond to the component of force which travels down the tank. It can be reasoned quite readily that the voltages cancel one another and hence the spurious signal resulting from such a blow by a wrench or for any other reason would be cancelled out and there would be no resulting detrimental effect on the utility device 42.

Figure 5:
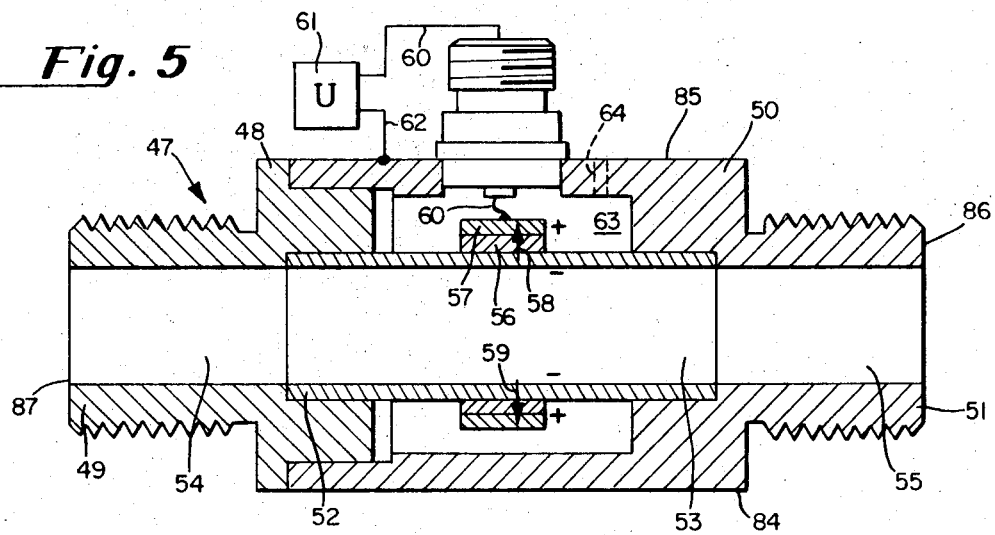
FIG. 5 depicts the present invention employed as an in-line pressure transducer.

FIG. 5 depicts an embodiment of the present invention used in an in-line mode of operation. In FIG. 5 there is shown a coupling member 47 which is composed of a metallic end piece 48 having a threaded protrusion 49, and a second end piece 50 having a threaded protrusion 51. The end piece 50 is secured to the end piece 48 to form a complete housing and within the complete housing there is mounted a detection section 52 which has an aperture 53 therein which is formed to join with the aperture 54 of the end piece 48 and the aperture 55 of the end piece 50 to form a continuous channel or aperture throughout the entire housing 47. Actually the overall channel formed by the apertures 54, 53 and 55 is normally of the same dimension as the fluid conduit which is carrying the fluid that is to be monitored. In other words, it is normally the practice to mount the housing 47 between two pieces of conduit carrying a fluid by a plumber's "union" or some other similar device which will enable the housing 47 to be threaded up tight so that the aperture of the housing 47 which is composed of the apertures 53, 54 and 55 simply enables the fluid to pass therethrough without interruption in normal flow in the conduit.

In the coupling member 47, the detection section 52 is shown in sectional form and the wall is in particular shown to be only of the same thickness as the crystal 56 and the collector ring 57. This need not be the case. The wall of the detection section 52 may be very much thicker if the pressure of the fluid that is being transmitted along the conduit is a high pressure and on the other hand this wall can be relatively thin as shown in FIG. 5, if the pressure of the fluid flowing therethrough is relatively low.

In view of the previous discussion it should be apparent that when there is a change in pressure of the fluid being transported along the conduit and through the coupling member 47, this change in pressure will be reflected by a component of force which is radial to the longitudinal axis of the aperture of the coupling member 47, and this of course will provide a strain in the crystal 56 from the inside surface toward the outside surface. There will be a resulting voltage generated and since the crystal 56 is polarized as shown by the arrows 58 and 59 the resulting voltage which is generated will be depicted as shown. Accordingly then the crystal 56 acts like a battery with one part of the connecting circuit being along the wire 60 to the utility device 61 and the other side of the circuit being along the wall of the center piece 52 through the end piece 48 and through the portion of the end piece 50 along the line 62 to the utility device 61.

The structure of FIG. 5 can be used in at least one other configuration wherein the housing is made wider such that the surface 84 and the surface 85 are extended longitudinally to meet the end surfaces 86 and 87, respectively, and these additional pieces are internally threaded. In other words, the protrusions 51 and 49 would not be present but the housing 47 would be one solid piece with the end simply internally threaded instead of having the protrusion externally threaded. In effect there would be a built-in plumber's "union" and the conduit would simply be threaded into the internal threading of the transducer itself.

One of the advantages of the present invention over the prior art as mentioned before is very apparent as we study FIG. 5. The device 47 as shown in FIG. 5 is an in-line pressure transducer which provides no impediment to the fluid flow and therefore no loading of the fluid device itself. When there is change in pressure it is easily detected by the radially poled piezo-electric transducer as just described, and yet this transducer does not deter that fluid flow as did in-line transducers of the prior art. In addition the present transducer has all of the advantages as described in connection with FIG. 4. That is to say, the transducer shown in FIG. 5 is immune from spurious signals which are caused by vibrations on the conduit, hard blows from wrenches, etc. and is not limited in the degree of pressure that can be tolerated by the physical strength of the crystal structure itself. In addition, if the user should want to measure a differential pressure the chamber 63 can be evacuated through a port, such as the port 64 shown in phantom, or can be filled with a pressurized gas as described earlier.

Figure 6:
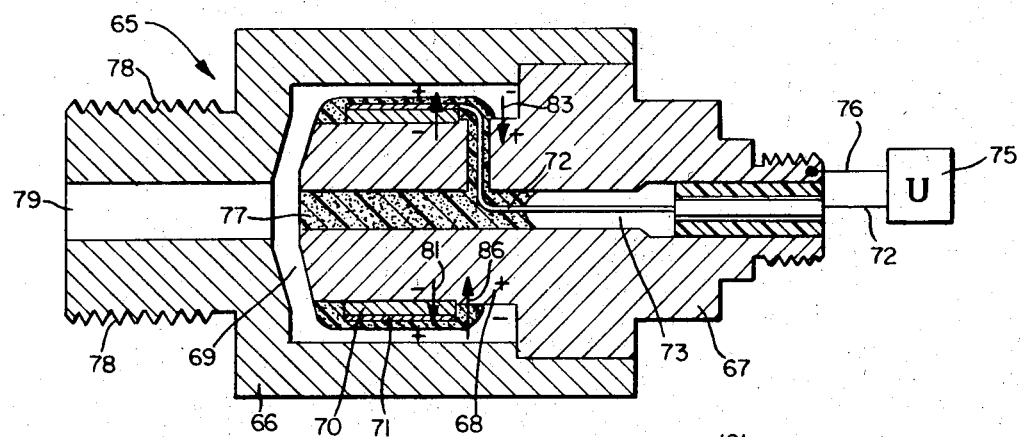
FIG. 6 depicts the present invention wherein the crystal sensor is subjected to compressing forces rather than expanding forces.

FIG. 6 shows the present invention as used with a device that directly subjects the crystal to the pressure changes for obtaining high sensitivity readings and yet which does not limit the use of the crystal to the physical strength of the crystal itself. In FIG. 6 there is shown a coupling member 65 which is composed of a front piece 66 and a rear piece 67. The front piece 66 and the rear piece 67 are made of good electrically conducting metal such as stainless steel and are secured together to provide a single housing piece. The rear piece 67 has a detection section 68 which protrudes into the chamber 69 and about which there is mounted the looped crystal 70. Surrounding the looped crystal 70 is the collector ring 71. Connected to the collector ring 71 is the wire 72 which is connected from the middle of the ring piece through an aperture 73 to the utility device 74. The other side of the circuit is from the ring 71, through the rear piece 67 along the line 76 to the utility device.

The aperture 73 is "filled in" by some potting material such as epoxy resin 77 to provide a sealant of that chamber against the fluid the necessity of which will become apparent immediately hereinafter. In addition the side portions of the piezo-electric crystal and the connecting ring are also sealed by the epoxy resin to keep the fluid from seeping in between and disrupting the electrical contact of these elements. However the depth of the epoxy may be very thin so that the connecting ring and the crystal sensor are virtually exposed to the pressure chamber 69.

Assume once again that the coupling member 65 is mounted or screwed into the side wall of the tank by virtue of the threads 78. The fluid whose pressure is going to be monitored or measured of course flows into the aperture 79 and into the pressure chamber 69 and completely surrounds the looped crystal and the connecting ring. When there is a change in pressure this pressure is reflected by a component of force which would tend to compress the crystal 70 from the outside wall or the inside wall. It will be noted that as in the other cases the crystal has been polarized from the inside wall toward the outside wall as evidenced by the arrows 80 and 81. When the forces are applied as represented by the arrows 82 and 83 the voltages will be generated with the opposite polarity, but they will nonetheless be additive and provide a difference of potential across the utility device 75.

The embodiment of the invention shown in FIG. 6 can be used to provide very sensitive measurements of pressure because of the virtually complete exposure of the crystal to the fluid whose pressure is being monitored and yet this device can be subjected to great pressures because the crystalline structure is backed by the rear piece 67 and this provides great physical strength to the crystalline structure. This mode of operation of course has an advantage over the use of the piezo-electric crystals of the prior art where high pressure operations were limited to the physical strength in the crystalline structure itself. The device shown in FIG. 6 has all the advantages of the previously described devices although this device cannot be used to measure absolute or differential pressures since the necessary chamber for such measurements is not present.

Figure 7:
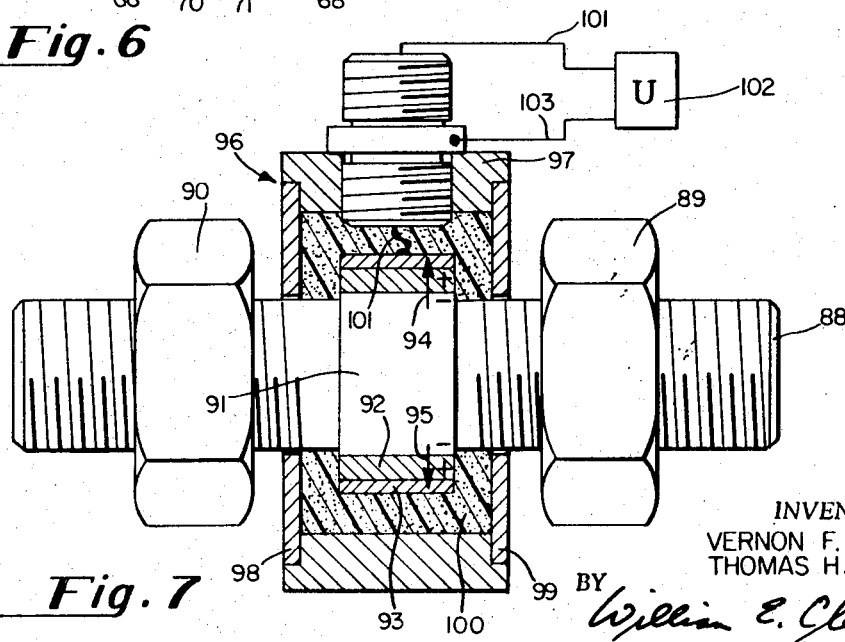
FIG. 7 depicts the present invention employed as a force transducer used to detect forces applied to solid materials as compared with fluid materials.

FIG. 7 depicts the present invention as it is employed to measure the forces on a solid body. Shown in FIG. 7 is a bolt 88 which is threaded partway on both ends thereof. In addition, there is also shown a pair of nuts 89 and 90 which are threaded onto the respective ends of the bolt 88. The middle portion of the bolt has been formed to have a flange-like configuration 91 which is the detection section and on which there is mounted the looped piezo-electric crystal 92 and therearound the collector ring 93. Once again, assume that the piezo-electric crystal has been poled as represented by the arrows 94 and 95. Surrounding the piezo-electric crystal and the collector ring is a housing device 96 which is composed of a main housing structure 97 and two end caps 98 and 99. The chambers formed by the end caps 98 and 99 with the main housing 97 are filled with a soft material such as rubber 100. The electrical circuit is connected from the collector ring 93 through the wire 101 to the utility device 102 and the other side of the circuit is from the housing 97 along the wire 103 to the insulator device 102. By having the threaded bolt 88 formed as just described the transducer can be connected in parallel to a device the strain of which is going to be measured, or it can be connected directly in line with the device being used, or in a number of configurations all of which tend to provide forces which are applied along the longitudinal axis of the bolt 88. When a force is applied along the longitudinal axis of the bolt 88 it tends to "squeeze" the flange 91 which in turn produces a strain on the piezo-electric crystal 92 and accordingly generates a voltage therein. The voltage signal is transmitted along the electric circuit just described in the utility device 102. The advantage of the present transducer as to eliminating spurious signals because of the cancelling effect of the voltages generated is quite apparent in a solid mechanism when we consider that if there were any vibrations or unusual jars or blows to the strut or column upon which the transducer is mounted a component of force which would travel with such an ultrasonic wave of energy might well be in the main parallel to the longitudinal axis of the bolt itself. Such a component of force would have no effect on the present transducer. On the other hand if the column or the rod or whatever was being monitored were plucked like a bow string or there was a vibratory movement of that kind such a movement would be parallel to the polarization of the piezo-electric crystal shown in FIG. 7 but the voltages generated thereby would cancel one another so as to eliminate any spurious signals which might ordinarily be generated by such an unwarranted force on the device.

What is claimed is:

1. A detecting device for detecting a force to which a principal device is subjected comprising in combination: a coupling member adapted to be coupled to said principal device, said coupling member formed to be subjected to forces which are directly related to forces to which said principal device is subjected, said coupling member being further formed to have a detection section which can be fitted with a looped structure: a piezo-electric element formed into a looped structure having an inside surface and an outside surface and which is fitted with said detection section such that said inside surface is in close proximity to said detection section and said outside surface lies away from said detection section, said piezo-electric element being fabricated such that it is polarized from said inside surface toward said outside surface; connecting ring means formed into a looped structure and fitted along said outside surface of said piezo-electric element; and output circuitry means connected to said connecting ring means and to said piezo-electric element to respond to a voltage generated thereat when said piezo-electric element is subjected to a force directed from said inside surface to said outside surface and alternatively vice-versa.

2. A detecting device according to claim 1 wherein said coupling member is formed to be used to detect fluid pressures and wherein said coupling member has securing means to secure said coupling member to an aperture in said principal device and wherein said coupling member has an aperture therein which opens into said aperture in said principal device and which extends into said detection section so as to be axially located within the looped structure of said piezo-electric element.

3. A detecting device according to claim 2 wherein said coupling member further includes a hollow chamber surrounding said connecting ring and said piezo-electric element and wherein said chamber includes means to enable it to be opened to the outer surface of said coupling member whereby said chamber can be filled with a fluid under pressure to obtain a relative pressure value between the pressure of the fluid of said principal device and the pressure of the fluid in said chamber and alternatively whereby said chamber can be evacuated to obtain an absolute pressure value.

4. A detecting device according to claim 1 whereby said coupling device is fabricated from electrically conducting material and whereby said output circuitry means is connected to said piezo-electric element through said coupling member.

5. A detecting device according to claim 2 wherein said aperture in said coupling member is expanded within said detection section to render the walls between said aperture and said piezo-electric relatively thin.

6. A detecting member according to claim 1 wherein said coupling member is formed to be used to detect fluid pressures in an in-line mode of operation and wherein said coupling member has securing means to secure said coupling member with said principal device so that fluid passing through said principal device will pass through said coupling member and wherein said coupling member has an aperture formed therethrough to permit fluid passing through said principal device to pass through said coupling member and wherein said detection section is formed axially about said aperture so that said aperture passes axially through said looped piezo-electric element.

7. A detecting device according to claim 1 wherein said coupling member has a securing means to secure said coupling member to an aperture in said principal device and wherein said coupling member has an aperture therein which opens into said aperture in said principal device and wherein said aperture in said coupling member is formed to extend around said connecting ring and said piezo-electric element.

8. A detecting device according to claim 7 wherein said connecting ring and said piezo-electric element are coated with a layer of protecting material to protect said connecting ring and said piezo-electric element from coming in contact with fluids in said aperture of said coupling member.

9. A detecting device according to claim 1 wherein said coupling member includes a substantially solid member, said substantially solid member being formed to provide securing means to secure said coupling member to said principal device, said solid member being further formed to provide said detection section, said detection formed such that said solid member passes axially through said looped piezo-electric element, whereby as forces which are applied to said principal device are transmitted through said solid member to affect said detection section and accordingly to generate voltages in said piezo-electric member.

10. A detecting device according to claim 9 wherein there is further included a housing member which encompasses said detection section, said piezo-electric element and said connecting ring and which provides means for passing said output circuitry means therethrough.

References Cited

UNITED STATES PATENTS

| 2,808,524 | 10/1957 | Feinstein | 310—8.4 |
| 3,050,034 | 8/1962 | Benton | 310—9.7X |
| 2,746,291 | 5/1956 | Swengel | 73—194 |

MILTON O. HIRSHFIELD, Primary Examiner

B. A. REYNOLDS, Assistant Examiner

U.S. Cl. X.R.

73—194; 310—8.1, 8.3, 9.5